United States Patent
Xu et al.

(10) Patent No.: US 12,440,927 B1
(45) Date of Patent: Oct. 14, 2025

(54) HIGH-HEAT-INPUT COMBINED WELDING METHOD FOR THICK-WALLED HIGH-STRENGTH STEEL

(71) Applicant: Tianjin University, Tianjin (CN)

(72) Inventors: Lianyong Xu, Tianjin (CN); Yongdian Han, Tianjin (CN); Zhaowei Xue, Tianjin (CN); Lei Zhao, Tianjin (CN); Kangda Hao, Tianjin (CN)

(73) Assignee: Tianjin University, Tianjin (CN)

( * ) Notice: Subject to any disclaimer, the term of this patent is extended or adjusted under 35 U.S.C. 154(b) by 0 days.

(21) Appl. No.: 19/220,069

(22) Filed: May 27, 2025

(30) Foreign Application Priority Data

Aug. 23, 2024 (CN) .......................... 202411161692.8

(51) Int. Cl.
*B23K 33/00* (2006.01)
*B23K 9/16* (2006.01)
*B23K 9/173* (2006.01)
*B23K 9/18* (2006.01)

(52) U.S. Cl.
CPC ............ *B23K 33/004* (2013.01); *B23K 9/164* (2013.01); *B23K 9/173* (2013.01); *B23K 9/188* (2013.01)

(58) Field of Classification Search
CPC ........ B23K 9/173; B23K 9/188; B23K 9/164; B23K 33/004
See application file for complete search history.

(56) References Cited

FOREIGN PATENT DOCUMENTS

| CN | 103659012 | 3/2014 |
|---|---|---|
| CN | 108856970 | 11/2018 |
| CN | 109047997 | 12/2018 |
| CN | 115338516 | 11/2022 |
| CN | 116890180 | 10/2023 |

OTHER PUBLICATIONS

Machine Translation of Yang et al., CN 103659012, performed on Jul. 16, 2025 (Year: 2014).*
Machine Translation of Tian et al., CN 108856970, performed on Jul. 16, 2025 (Year: 2018).*

* cited by examiner

*Primary Examiner* — Brian W Jennison
(74) *Attorney, Agent, or Firm* — JCIPRNET

(57) ABSTRACT

A high-heat-input combined welding method for thick-walled high-strength steel includes following steps. First, a steel plate to be welded is machined into an asymmetric double-sided V-groove, with a depth of a front groove ranging from 30 mm to 40 mm. Then, electrogas welding is used to fill and weld the front groove, with a single-pass heat input controlled below 300 KJ/cm. Finally, a back groove is filled and welded, ensuring that the single-pass heat input for the back groove does not exceed that of the front groove. By adopting an asymmetric double-sided V-groove, the steel plate to be welded is divided into front and back sections. The depth of the groove is restricted to limit the heat input during filling welding.

5 Claims, 1 Drawing Sheet

HIGH-HEAT-INPUT COMBINED WELDING METHOD FOR THICK-WALLED HIGH-STRENGTH STEEL

CROSS-REFERENCE TO RELATED APPLICATION

This application claims the priority benefit of China application serial no. 202411161692.8, filed on Aug. 23, 2024. The entirety of the above-mentioned patent application is hereby incorporated by reference herein and made a part of this specification.

BACKGROUND

Technical Field

The disclosure belongs to the welding technology field, particularly a high-heat-input combined welding method for thick-walled high-strength steel.

Description of Related Art

The jacket platform is an important infrastructure in the process of offshore oil and gas exploitation. In recent years, with China's offshore oil and gas exploitation gradually developing towards low-temperature and deep-water environments, the thickness of steel used for jacket platforms has been increasing, and the requirements for welding efficiency become higher. Currently, Electrogas vertical welding (EGW), as an efficient high-heat-input welding technology, has attracted increasing attentions.

Twin-wire Electrogas welding, as an extension of single-wire electric gas welding, can achieve a maximum heat input of over 700 KJ/cm, enabling single-pass welding for plate thicknesses ranging from 42 mm to 85 mm. However, the significant increase in heat input will lead to coarse grains in the heat-affected zone of the welded joint, thereby deteriorating the impact toughness of the welded joint.

Publication of CN109047997A discloses a welding method for ultra-high heat input twin-wire electrogas welding. Publication of CN115338516A discloses a welding method for high-strength ultra-thick steel plates using twin-wire electrogas welding, where the impact toughness of the welded joint's heat-affected zone can meet the requirement of ≥70J at −40° C. However, considering that offshore jacket platforms are subjected to long-term impacts from typhoons and waves, coupled with increasingly harsh low-temperature deep-water environments, the current requirement is that the heat-affected zone of welded joints must have impact toughness≥50J at −60° C. The lowest impact toughness test temperature in the above-mentioned published documents is −40° C. Although significant improvements have been made in welding efficiency, there remains a deficiency in the overall low-temperature impact toughness of the welded joint's heat-affected zone, and whether it can meet the impact toughness requirements at −60° C. remains unknown.

To reduce the heat input of electrogas welding and further improve the impact toughness of welded joints, publication of CN116890180A discloses a groove design for high-strength steel thick plates and a twin-wire electrogas welding method, which essentially reduces the groove angle. This method can effectively decrease welding heat input. However, on one hand, the extent to which the groove angle can be reduced is limited by the oscillation amplitude of the welding gun during electrogas welding. On the other hand, the smaller the groove angle, the smaller the oscillation amplitude of the welding gun, which may lead to incomplete penetration at the weld root. Additionally, once the minimum groove angle is reached, the heat input will increase with the increase of the wall thickness. Therefore, the effectiveness of limiting heat input by reducing the groove angle remains quite limited.

SUMMARY

In view of defects in the related art, a purpose of the disclosure is to provide a high-heat-input combined welding method for thick-walled high-strength steel, aiming to solve the problem of poor impact toughness in conventional high-heat-input welding methods.

The high-heat-input combined welding method for thick-walled high-strength steel provided in this disclosure specifically comprises: machining the steel plate to be welded into an asymmetric double-sided V-groove, wherein the depth of the front groove is 30 mm to 40 mm; then filling and welding the front groove using electrogas welding while controlling the single-pass heat input below 300 KJ/cm; and finally filling and welding the back groove while ensuring that the single-pass heat input of the back groove does not exceed that of the front groove.

Compared with the prior art, the technical solution in this disclosure divides the steel plate to be welded into front and back sections by adopting an asymmetric double-sided V-groove. By restricting the groove depth to limit the heat input of electrogas welding, the solution avoids significant deterioration of toughness in the heat-affected zone of the welded joint, thereby effectively improving the mechanical properties of the welded joint.

Preferably, the front groove angle is 30°-40°, the back groove angle is 30°-50°, and the root face depth is 3 mm-5 mm.

Preferably, when performing filling welding on the front groove using electrogas welding, the welding current is 380A-460A, welding voltage is 38V-45V, welding speed is 3.5 cm/min-4.5 cm/min, and single-pass heat input is 200 kJ/cm-300 kJ/cm.

Preferably, when performing filling welding on the front groove using electrogas welding, the electrode extension length is 30 mm-35 mm, and shielding gas flow rate is 30 L/min-35 L/min.

Preferably, when performing filling welding on the front groove using electrogas welding, the welding torch oscillation amplitude is controlled at 10 mm-15 mm, with dwell time on each side being 0.3s-0.5s.

Preferably, when the back groove depth satisfies $H_2 \geq 25$ mm, flux-cored arc welding is used for filling welding.

Preferably, when the back groove depth satisfies 25 mm$<H_2 \geq 50$ mm, flux-cored arc welding is first used for filling welding; when the remaining groove depth h satisfies the following formula, electrogas welding is then used for filling welding, $$h \leq H_2 - \frac{\sqrt{H_2^2 \tan^2 \frac{\alpha_2}{2} - H_1^2 \tan \frac{\alpha_2}{2} \tan \frac{\alpha_1}{2}}}{\tan \frac{\alpha_2}{2}}$$

Where h represents the remaining groove depth, $H_2$ represents the back groove depth, $H_1$ represents the front groove depth, $\alpha_1$ represents the front groove angle, and $\alpha_2$ represents the back groove angle.

Preferably, when the back groove depth satisfies $H_2>50$ mm, triple-wire submerged arc welding is first used for filling welding; when the remaining groove depth h satisfies the following formula, electrogas welding is then used for filling welding.

$$h \leq H_2 - \frac{\sqrt{H_2^2\tan^2\frac{\alpha_2}{2} - H_1^2\tan\frac{\alpha_2}{2}\tan\frac{\alpha_1}{2}}}{\tan\frac{\alpha_2}{2}}$$

Wherein, h is the remaining groove depth, $H_2$ is the back groove depth, $H_1$ is the front groove depth, $\alpha_1$ is the front groove angle, and $\alpha_2$ is the back groove angle.

Preferably, when performing filling welding using flux-cored arc welding, the welding current is 160A-220A, welding voltage is 20V-23V, welding speed is 10 cm/min-16 cm/min, heat input is 10KJ/cm-20KJ/cm, electrode extension length is 12 mm-15 mm, and shielding gas flow rate is 15 L/min-25 L/min.

Preferably, when performing filling welding using triple-wire submerged arc welding, the leading wire welding current is 1160A-1380A, with welding voltage of 32V-35V; the middle wire welding current is 1100A-1280A, with welding voltage of 40V-42V; the trailing wire welding current is 950A-1200A, with welding voltage of 42V-46V; the triple-wire submerged arc welding speed is 35 cm/min-81 cm/min, with heat input of 90KJ/cm-260KJ/cm.

In general, the above technical solutions conceived by the disclosure have the following beneficial effects compared to the related art.

The present disclosure adopts an asymmetric double-sided V-groove to divide the steel plate to be welded into front and back sections. By restricting the groove depth to limit the heat input during filling welding, it avoids significant deterioration of toughness in the heat-affected zone of the welded joint, thereby effectively improving the mechanical properties of the welded joint and ensuring long-term safe service of deepwater jacket platforms.

In particular, the present disclosure optimizes the welding parameters for the front groove, which can ensure welding efficiency while preventing excessive heat input that would degrade the properties of the welded joint.

Meanwhile, the present disclosure optimizes the selection of welding processes for the back groove, enabling appropriate process selection based on back groove depth. This ensures welding efficiency while preventing mechanical property degradation caused by excessive heat input.

DESCRIPTION OF THE EMBODIMENTS

In order for the objectives, technical solutions, and advantages of the disclosure to be more comprehensible, the disclosure is further described in detail below in conjunction with the embodiments accompanied with drawings. It should be understood that the specific embodiments described herein are only used to describe the disclosure and are not used to limit the disclosure.

Figure 1:
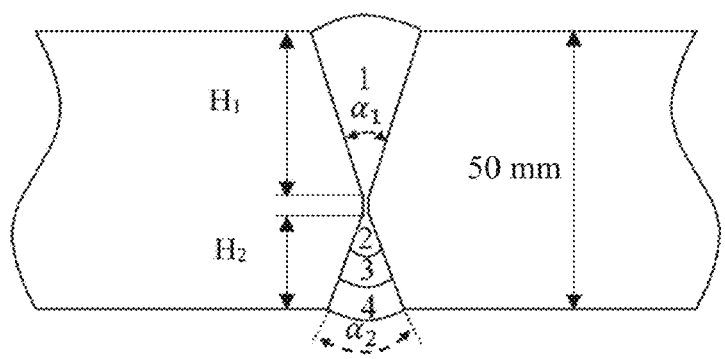
FIG. 1 is a schematic diagram of the welding groove and weld passes according to embodiment 1, wherein weld pass 1 is electrogas welding, and weld passes 2, 3 and 4 are flux-cored arc welding (FCAW)
Figure 2:
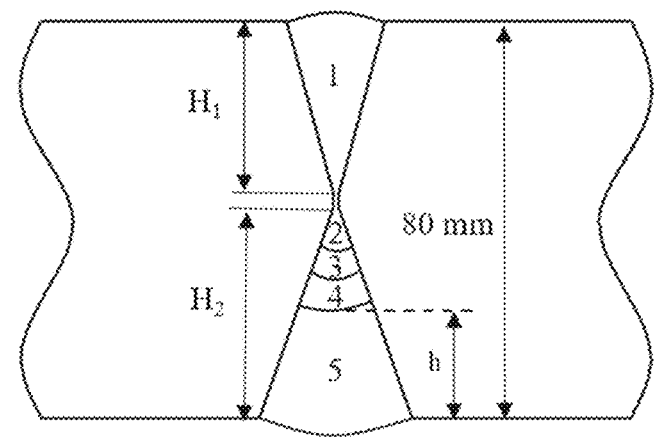
FIG. 2 is a schematic diagram of the welding groove and weld passes according to embodiment 2, wherein weld pass 1 is electrogas welding, weld passes 2, 3 and 4 are flux-cored arc welding, and weld pass 5 is electrogas welding.
Figure 3:
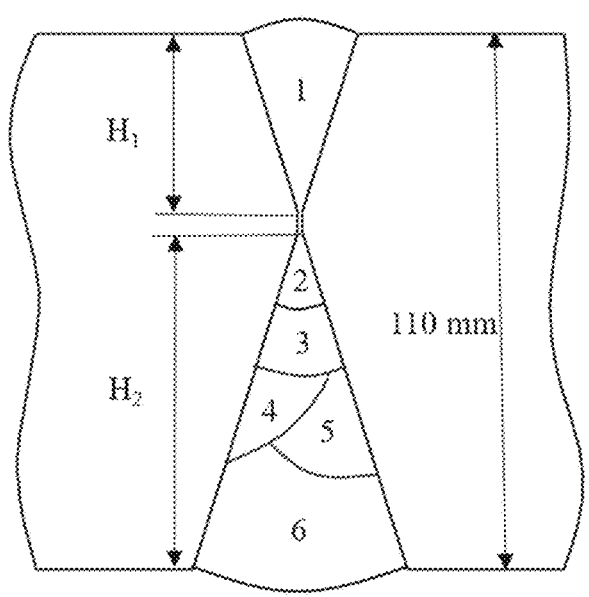
FIG. 3 is a schematic diagram of the welding groove and weld passes according to embodiment 3, wherein weld pass 1 is electrogas welding, weld passes 2, 3, 4 and 5 are triple-wire submerged arc welding (SAW), and weld pass 6 is electrogas welding (EGW).

As shown in FIG. 1 to FIG. 3, it provides a high-heat-input combined welding method for thick-walled high-strength steel, specifically comprising:

Step S1: for thick-walled high-strength steel with thickness of 50 mm-120 mm, first processing the steel plates to be welded by adopting an asymmetric double-sided V-groove, wherein the front groove angle $\alpha_1$ is 30°-40°, the front groove depth $H_1$ is fixed at 30 mm-40 mm, the back groove angle $\alpha_2$ is 30°-50°, and a root face with depth of 3 mm-5 mm is reserved to prevent burn-through at the root during electrogas welding due to heat accumulation.

Step S2: aligning the steel plates to be welded with a 2 mm-3 mm gap and install three backing rib plates on the back side using manual arc welding to prevent deformation during electrogas welding.

Step S3: performing single-pass filling welding on the front groove using electrogas welding to form the front weld, by fixing the front groove depth to limit heat input, the single-pass heat input can be controlled below 300KJ/cm, preferably 200KJ/cm-300KJ/cm.

Step S4: removing the backing rib plates and performing back groove welding, using one or more of the following processes for multi-pass filling welding to form the back weld: flux-cored arc welding, electrogas welding, or triple-wire submerged arc welding, while ensuring the single-pass heat input of the back groove does not exceed that of the front groove.

The present disclosure adopts an asymmetric double-sided V-groove to divide the steel plate into front and back sections. By restricting the groove depth to limit the heat input of electrogas welding, it prevents embrittlement of the heat-affected zone (HAZ) while maintaining welding efficiency, thereby avoiding significant deterioration of toughness in the welded joint's HAZ. This effectively enhances the mechanical properties of the welded joint and ensures long-term safe service of deepwater jacket platforms.

Furthermore, when performing filling welding on the front groove using electrogas welding, welding current is 380A-460A, welding voltage is 38V-45V, welding speed is 3.5 cm/min-4.5 cm/min, single-pass heat input is 200 kJ/cm-300KJ/cm; preferred wire diameter is 1.6 mm, electrode extension length is 30 mm-35 mm, shielding gas is $CO_2$, gas flow rate is 30 L/min-35 L/min. To prevent lack of fusion and other defects during welding, the welding torch must be oscillated and the oscillation amplitude is controlled within 10 mm-15 mm, dwell time on each side is 0.3s-0.5s. By optimizing these welding parameters, the method ensures welding efficiency while preventing excessive heat input that would degrade joint performance.

Furthermore, considering that electrogas welding is specifically designed for single-pass welding of thick plates, if the plates are too thin, EGW is not suitable; if the plates are too thick, it would suffer excessive heat input if filled directly by single-pass EGW, leading to decrease of mechanical properties. Therefore, as plate thickness increases, other welding processes must first be used to partially fill the groove, and the remaining portion is completed with electrogas welding. Meanwhile, the greater the plate thickness, the more the portion that needs to be filled by other processes, the deeper the back groove depth, and the adoption of welding processes with higher heat input is to improve welding efficiency.

When the back groove depth $H_2 \leq 25$ mm, only flux-cored arc welding is used for filling welding.

When the back groove depth is $25 < H_2 \leq 50$ mm, flux-cored arc welding is first used for filling welding. When the remaining groove depth h meets the requirements, electro-gas welding is then used for filling welding. To ensure the properties of the welded joint, the heat input of the back electrogas welding should not exceed that of the front electrogas welding. Since the heat input of electrogas welding is determined by the cross-sectional area of the groove, it is necessary to satisfy the cross-sectional area of the remaining back groove $S_2 \leq$ the cross-sectional area of the front groove $S_1$, that is:

$$h\left[(H_2 - h)\tan\frac{\alpha_2}{2} + H_2\tan\frac{\alpha_2}{2}\right] \leq H_1^2\tan\frac{\alpha_1}{2} \quad (1)$$

In the formula, h represents groove depth, $H_2$ represents back groove depth, $H_1$ represents front groove depth, $\alpha_1$ represents front groove angle, $\alpha_2$ represents back groove angle. Based on formula (1), formula (2) can be derived as follows:

$$h \leq H_2 - \frac{\sqrt{H_2^2\tan^2\frac{\alpha_2}{2} - H_1^2\tan\frac{\alpha_2}{2}\tan\frac{\alpha_1}{2}}}{\tan\frac{\alpha_2}{2}} \quad (2)$$

Therefore, when the remaining groove depth h satisfies formula (2), electrogas welding is used for filling welding.

When the back groove depth satisfies $H_2 > 50$ mm, triple-wire submerged arc welding is first used for filling welding. When the remaining groove depth h satisfies formula (2), electrogas welding is then used for filling welding.

Further, when adopting flux-cored arc welding for the filling passes, the process parameters are as follows: welding current is within 160A-220A, arc voltage is within 20V-23V, welding speed is within 10 cm/min-16 cm/min, with heat input of 10KJ/cm-20KJ/cm. The preferred wire diameter is 1.2 mm, electrode extension is within 12 mm-15 mm, a shielding gas mixture is 82% Ar+18% $CO_2$, and the gas current is at 15 L/min-25 L/min. This optimized parameter set ensures the welding efficiency while preventing excessive heat input from decreasing the mechanical properties of the welded joint.

During triple-wire submerged arc welding for filling passes, the front wire inclines forward and adopts a welding current range of 1160A-1380A, voltage range of 32V-35V, and preferably uses a 4.8 mm diameter wire; the middle wire is vertically positioned and adopts a welding current range of 1100A-1280A, voltage range of 40V-42V, and a 4.8 mm diameter wire; the rear wire inclined backward and adopts a welding current range of 950A-1200A, voltage range of 42V-46V, and a 6.4 mm diameter wire, while the welding speed of triple-wire submerged welding ranges from 35 cm/min to 81 cm/min with a heat input between 90KJ/cm and 260 kJ/cm. Optimization of these filling welding parameters ensures welding efficiency while preventing excessive heat input from decreasing the mechanical properties of the welded joint.

The technical solutions of this disclosure are further illustrated by embodiments below.

Embodiment 1

In this embodiment, a 50 mm-thick high-strength steel plate is used as an example, and the detailed procedure is as follows:

Step S1: preparation of steel plates to be welded: the welding groove adopts an asymmetric double-sided V-groove, with a front groove angle of 35°, front groove depth $H_1$ of 30 mm, back groove angle of 40°, and a 3 mm root face left.

Step S2: aligning the steel plates to be welded with a 2 mm gap and installing three backing rib plates on the back side using manual arc welding to prevent deformation during electrogas welding; FIG. 1 illustrates the completed groove after aligning.

Step S3: the front-side electrogas vertical welding was carried out to form the front weld using the following parameters: a welding current of 380 A, welding voltage of 38V, and welding speed of 3.8 cm/min. The process adopts a 1.6 mm diameter electrogas welding wire with a 30 mm wire extension length. Pure $CO_2$ shielding gas is used at a flow rate of 30 L/min. The welding torch was operated with a 12 mm oscillation width and 0.4s dwell time on each side, and a single-pass heat input is approximately 205 KJ/cm.

Step S4: the backing rib plates are removed and backing groove welding was performed. Since $H_2 \leq 25$ mm is satisfied, flux-cored arc welding was exclusively used for filling, as shown in FIG. 1, backside weld passes 2, 3 and 4 were welded by flux-cored arc welding with the following parameters: welding current of 160 A, welding voltage of 23V, and welding speed of 12 cm/min. The process utilized 1.2 mm diameter flux-cored wire with 12 mm wire extension length. The shielding gas is 82% Ar+18% $CO_2$ at a flow rate of 25 L/min, and heat input is approximately 16 kJ/cm.

Embodiment 2

Same as embodiment 1, except that in step S4, the welding parameters are adjusted as follows: welding current of 200 A, welding voltage of 20V, and welding speed of 10 cm/min. The shielding gas flow rate is set at 20 L/min, and the heat input is approximately 21 kJ/cm.

Embodiment 3

Same as embodiment 1, except that in step S4, the welding parameters were adjusted as follows: welding current of 220 A, welding voltage of 21V, and welding speed of 10 cm/min. The shielding gas flow rate was set at 22 L/min, and the heat input is approximately 25 KJ/cm.

Embodiment 4

In this embodiment, an 80 mm-thick high-strength steel plate is used as an example, and the detailed procedure is as follows:

Step S1: preparation of steel plates to be welded: the welding groove adopts an asymmetric double-sided V-groove, with a front groove angle of 30°, front groove depth $H_1$ of 35 mm, back groove angle of 30°, and a 4 mm root face left.

Step S2: aligning the steel plates to be welded with a 2 mm gap and installing three backing rib plates on the back side using manual arc welding to prevent deformation during electrogas welding; FIG. 2 illustrates the completed groove after aligning.

Step S3: the front-side electrogas welding is carried out to form the front weld using the following parameters: a welding current of 400 A, welding voltage of 42V, and welding speed of 4 cm/min. The process adopts a 1.6 mm diameter electrogas welding wire with a 35 mm wire extension length. Pure $CO_2$ shielding gas is used at a flow rate of 32 L/min. The welding torch is operated with a 10 mm oscillation width and 0.3s dwell time on each side, and a single-pass heat input is approximately 226 kJ/cm.

Step S4: The backing rib plates are removed and backing groove welding was performed. Since 25 mm<H2≤50 mm is satisfied, flux-cored arc welding was exclusively used for filling, according to formula (2), when the remaining groove depth satisfies h≤19.6 mm, electrogas welding is then employed for filling. As shown in FIG. 2, weld passes 2, 3 and 4 are welded by flux-cored arc welding with the following parameters: welding current of 220 A, welding voltage of 22V, and welding speed of 12 cm/min. The process utilized 1.2 mm diameter flux-cored wire with 12 mm wire extension length. The shielding gas is 82% Ar+18% $CO_2$ at a flow rate of 20 L/min, and heat input is approximately 21 kJ/cm.

The remaining groove depth is measured. If it is less than 19.6 mm, electrogas welding is adopted for weld pass 5, with a welding current range of 380A, welding voltage of 40V, and welding speed of 4.5 cm/min. Other parameters remain consistent with the electrogas welding for the front groove. If it is greater than 19.6 mm, continue filling with flux-cored arc welding until it is less than 19.6 mm, then switch to electrogas welding for filling.

Embodiment 5

Same as embodiment 4, except that in step S3, during flux-cored arc welding filling, the welding current is 160A, the welding voltage is 20V, the welding speed is 12 cm/min, the gas flow rate is 25 L/min, and the heat input is approximately 14 kJ/cm.

Embodiment 6

Same as embodiment 4, except that in step S3, during flux-cored arc welding filling, the welding current is 220A, welding voltage is 23V, welding speed is 10 cm/min, gas flow rate is 22 L/min, and the heat input is approximately 27 kJ/cm.

Embodiment 7

In this embodiment, a 110 mm-thick high-strength steel plate is used as an example, and the detailed procedure is as follows:

Step S1: preparation of steel plates to be welded: the welding groove adopts an asymmetric double-sided V-groove, with a front groove angle of 40°, front groove depth $H_1$ of 40 mm, back groove angle of 50°, and a 5 mm root face left.

Step S2: aligning the steel plates to be welded with a 3 mm gap and installing three backing rib plates on the back side using manual arc welding to prevent deformation during electrogas welding; FIG. 3 illustrates the completed groove after aligning.

Step S3: the front-side electrogas welding was carried out to form the front weld using the following parameters: a welding current of 450 A, welding voltage of 44V, and welding speed of 4.2 cm/min. The process adopts a 1.6 mm diameter electrogas welding wire with a 30 mm wire extension length. Pure $CO_2$ shielding gas is used at a flow rate of 35 L/min. The welding torch is operated with a 15 mm oscillation width and 0.5s dwell time on each side, and a single-pass heat input is approximately 254 KJ/cm.

Step S4: The backing rib plates are removed and backing groove welding is performed. Since H2>50 mm, flux-cored arc welding is used for filling, according to formula (2), when the remaining groove depth h≤16.6 mm, electrogas welding is then employed for filling. As shown in FIG. 3, weld passes 2, 3, 4 and 5 are welded by flux-cored arc welding with the following parameters: the welding current range for the front wire is 1280A, welding voltage is 34V, and electrode wire diameter is 4.8 mm; welding current range for the middle wire is 1160A, welding voltage range is 42V, and the electrode wire diameter is 4.8 mm; the welding current for the rear wire is 950A, the welding voltage is 2V, and electrode wire diameter is 6.4 mm, welding speed is 45 cm/min, and heat input is approximately 160 KJ/cm.

The remaining groove depth is measured. If it is less than 16.6 mm, electrogas welding is adopted for weld pass 6, with a welding current range of 380A, welding voltage of 45V, and welding speed of 4.5 cm/min. Other parameters remain consistent with the electrogas welding for the front groove. If it is greater than 16.6 mm, continue filling with flux-cored arc welding until it is less than 16.6 mm, then switch to electrogas welding for filling.

Embodiment 8

Same as embodiment 7, except that in step S4, during flux-cored arc welding filling, the welding current range for the front wire is 1380A, and the welding voltage is 35V; the welding current range for the middle wire is 1100A, and the welding voltage range is 40V; the welding current for the rear wire is 1200A, and the welding voltage is 46V, the welding speed is 60 cm/min, and the heat input is approximately 135 KJ/cm.

Embodiment 9

Same as embodiment 7, except that in step S4, during flux-cored arc welding filling, the welding current range for the front wire is 1160A, and the welding voltage is 33V; the welding current range for the middle wire is 1280A, and welding voltage range is 41V; the welding current for the rear wire is 1100A, and welding voltage is 44V, the welding speed is 50 cm/min, and the heat input is approximately 150 KJ/cm.

The above description is only preferred embodiments of the disclosure and is not intended to limit the disclosure. Any modifications, equivalent replacements, and modifications made without departing from the spirit and principles of the disclosure should fall within the protection scope of the disclosure.

What is claimed is:

1. A high-heat-input combined welding method for thick-walled high-strength steel, comprising:
   machining a steel plate to be welded into an asymmetric double-sided V-groove, wherein a depth of a front groove is 30 mm to 40 mm; then filling and welding the front groove using electrogas welding while controlling a single-pass heat input below 300 kJ/cm; and finally filling and welding a back groove while ensuring that the single-pass heat input of the back groove does not exceed that of the front groove,
   wherein, when a back groove depth satisfies $H_2 \leq 25$ mm, flux-cored arc welding is configured for filling welding; when the back groove depth satisfies 25 mm<$H_2 \leq 50$ mm, flux-cored arc welding is first configured for filling welding; when a remaining groove depth h satisfies following formula, electrogas welding is then configured for filling welding, $$h \le H_2 - \frac{\sqrt{H_2^2\tan^2\frac{\alpha_2}{2} - H_1^2\tan\frac{\alpha_2}{2}\tan\frac{\alpha_1}{2}}}{\tan\frac{\alpha_2}{2}}$$

in the formula, h represents the remaining groove depth, $H_2$ represents the back groove depth, $H_1$ represents a front groove depth, $\alpha_1$ represents a front groove angle, and $\alpha_2$ represents a back groove angle;

when the back groove depth satisfies $H_2 > 50$ mm, triple-wire submerged arc welding is first configured for filling welding; when the remaining groove depth h satisfies the formula, electrogas welding is then configured for filling welding, $$h \le H_2 - \frac{\sqrt{H_2^2\tan^2\frac{\alpha_2}{2} - H_1^2\tan\frac{\alpha_2}{2}\tan\frac{\alpha_1}{2}}}{\tan\frac{\alpha_2}{2}}$$

in the formula, h represents the remaining groove depth, $H_2$ represents the back groove depth, $H_1$ represents the front groove depth, $\alpha_1$ represents the front groove angle, and $\alpha_2$ represents the back groove angle, wherein when adopting flux-cored arc welding for filling passes, welding current is within 160A-220A, arc voltage is within 20V-23V, welding speed is 10 cm/min-16 cm/min with heat input of 10 kJ/cm-20 kJ/cm, the electrode extension is within 12 mm-15 mm, and the gas current is at 15 L/min-25 L/min, wherein when performing filling welding using triple-wire submerged arc welding, leading wire welding current is 1160A-1380A with welding voltage of 32V-35V; middle wire welding current is 1100A-1280A with welding voltage of 40V-42V; trailing wire welding current is 950A-1200A with welding voltage of 42V-46V; triple-wire submerged arc welding speed is 35 cm/min-81 cm/min with heat input of 90KJ/cm-260KJ/cm.

2. The high-heat-input combined welding method according to claim 1, wherein the front groove angle is 30°-40°, the back groove angle is 30°-50°, and a root face depth is 3 mm-5 mm.

3. The high-heat-input combined welding method according to claim 1, wherein when performing filling welding on the front groove using electrogas welding, welding current is 380A-460A, welding voltage is 38V-45V, welding speed is 3.5 cm/min-4.5 cm/min, single-pass heat input is 200 kJ/cm-300 kJ/cm.

4. The high-heat-input combined welding method according to claim 1, wherein when performing filling welding on the front groove using electrogas welding, an electrode extension length is 30 mm-35 mm, and shielding gas flow rate is 30 L/min-35 L/min.

5. The high-heat-input combined welding method according to claim 1, wherein when performing filling welding on the front groove using electrogas welding, a welding torch oscillation amplitude is controlled at 10 mm-15 mm, and with dwell time on each side is 0.3s-0.5s.

* * * * *